United States Patent [19]
Allen et al.

[11] 3,823,777
[45] July 16, 1974

[54] MULTIPLE SOLVENT MISCIBLE FLOODING TECHNIQUE FOR USE IN PETROLEUM FORMATION OVER-LAYING AND IN CONTACT WITH WATER SATURATED POROUS FORMATIONS

[75] Inventors: Joseph C. Allen, Bellaire; Jack F. Tate, Houston, both of Tex.

[73] Assignee: Texaco Inc., New York, N.Y.

[22] Filed: May 4, 1973

[21] Appl. No.: 357,410

[52] U.S. Cl. .................................. 166/266, 166/274
[51] Int. Cl. ............................................ E21b 43/16
[58] Field of Search ........................... 166/266–275

[56] References Cited
UNITED STATES PATENTS

| | | | |
|---|---|---|---|
| 2,708,481 | 5/1955 | Allen | 166/268 |
| 3,003,554 | 10/1961 | Craig, Jr. et al. | 166/274 |
| 3,500,916 | 3/1970 | Van Der Knapp et al. | 166/272 |
| 3,500,917 | 3/1970 | Lehner et al. | 166/272 |
| 3,729,053 | 4/1973 | Froning | 166/273 |

Primary Examiner—James A. Leppink
Attorney, Agent, or Firm—T. H. Whaley; C. G. Ries

[57] ABSTRACT

A petroleum recovery method employing a mixed solvent for use in formation in contact with and overlaying a substantially water saturated porous formation which is prone to bottom water coning. The mixed solvent density is less than the density of water and greater than the density of the formation petroleum, and has a boiling point less than the boiling point of the formation petroleum. The solvent is injected into the formation near the petroleum-water interface and the mixture comprising solvent and petroleum is recovered from production wells. The solvent may be separated from the produced petroleum-solvent mixture by distillation and recondensation for reinjection into the formation.

18 Claims, 1 Drawing Figure

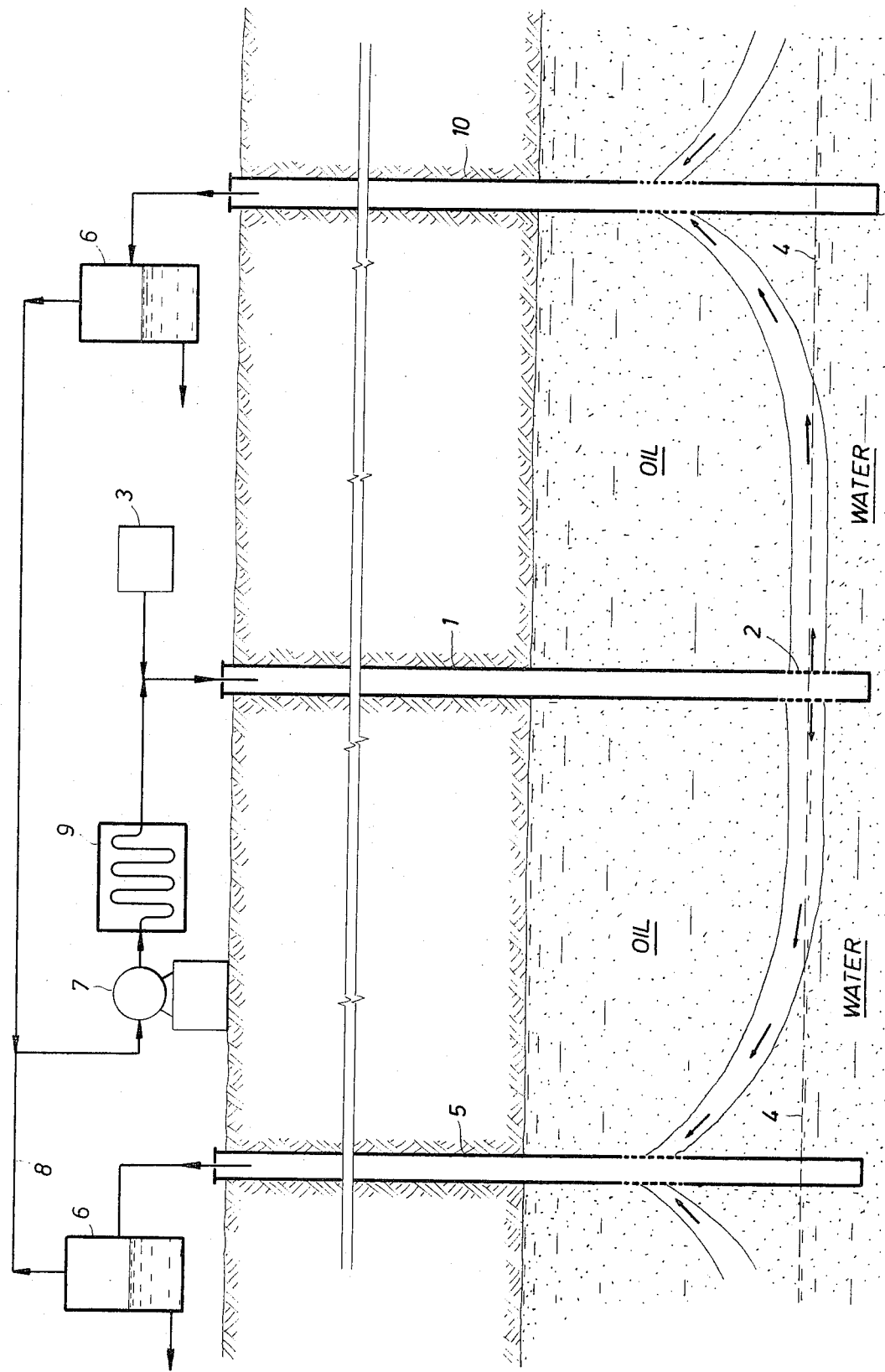

MULTIPLE SOLVENT MISCIBLE FLOODING TECHNIQUE FOR USE IN PETROLEUM FORMATION OVER-LAYING AND IN CONTACT WITH WATER SATURATED POROUS FORMATIONS

BACKGROUND OF THE INVENTION

1. Field of the Invention

This invention relates to a method of recovering petroleum from subterranean petroleum-containing formations, and more particularly to a miscible recovery technique especially adaptable for use in a subterranean, petroleum-containing formation which is in contact with and overlays a substantially water saturated porous formation which is normally prone to bottom water coning. In a specific embodiment a mixture of solvent, such as propane or butane, capable of dissolving petroleum and a dense solvent such as carbon disulfide or a halogenated hydrocarbon solvent is injected into the formation near the petroleum-water contact.

2. Description of the Prior Art

Petroleum is normally recovered from subterranean formations in which it has accumulated by penetrating the formation with one or more wells and pumping or permitting the petroleum to flow to the surface through these wells. Recovery of petroleum from petroleum-containing formations is possible only if certain conditions are satisfied. There must be an adequately high concentration of petroleum in the formation, and there must be sufficient porosity and permeability or interconnected flow channels throughout the formations to permit the flow of fluids therethrough if sufficient pressure is applied to the fluid. When the subterranean petroleum-containing formation has natural energy present in the form of an active, underlying water drive, or gas dissolved in the petroleum, or a high pressure gas cap above the petroleum, this natural energy is generally utilized to recover petroleum. Recovery of petroleum by utilization of natural energy is referred to as primary recovery. When this natural energy source is depleted, or in the instance of those formations which do not originally contain sufficient natural energy to permit primary recovery operations, some form of supplemental recovery process which supplies energy must be utilized in order to extract petroleum from the subterranean petroleum-containing formation. Supplemental recovery is frequently referred to as secondary or tertiary recovery, although in fact it may be primary, secondary or tertiary in sequence of employment.

Water flooding, which involves the injection of water into the subterranean formation for the purpose of displacing petroleum toward the producing well, is the most economical and widely practiced supplemental recovery method. Water does not displace petroleum with high efficiency, however, since water and oil are immiscible, and also because the interfacial tension between water and oil is quite high. Persons skilled in the art of oil recovery have recognized this weakness in water flooding, and the prior art teaches injecting a hydrocarbon solvent or other material miscible with the formation petroleum into the formation. The solvent is capable of interacting with formation petroleum by directly solubilizing them or partitioning into them, thus reducing the viscosity thereof so they are more readily displaced toward the production well. This type of flooding is especially applicable to reservoirs containing very viscous oil, e.g. oil having a viscosity in the excess of 50 centipoise. Although miscible flooding using solvent injection is highly efficient in terms of total oil recovery efficiency, it is not particularly attractive from economic point of view because of the relatively high cost of the solvent. The total cost of the solvent is often prohibitively expensive, even though the unit cost of solvent appears relatively low, because of the large quantity of solvent required for a conventional solvent injection recovery operation. Attempts have been made to inject a relatively small slug of solvent into the subterranean petroleum-containing formation, and follow this with water injection, with the hope that the solvent will mix with and dilute the formation petroleum, and the mixture of crude and solvent will then be displaced efficiently by the subsequently injected water. This has frequently met with failure for a variety of reasons, the most common being the tendency for the solvent to migrate toward the upper portion of the reservoir, overriding the formation fluid and the subsequently injected water to migrate toward the lower portion of the petroleum-containing formation, because of the gravity differences between the conventional hydrocarbon solvents, water and the formation petroleum.

Formations which overlay and are in contact with a substantially water saturated, porous formation, sometimes referred to as active bottom water drive formations experience a unique problem referred to as bottom water coning. As petroleum is removed from a portion of the reservoir, water migrates upward to occupy the space previously occupied by petroleum. When wells are pumped, as is done in normal recovery operations, the reduced pressure in the vicinity of the production well causes water to move upwards around the well, forming a generally cone-shaped water-filled zone. The result of the water cone formation is entrance of water into the production well, causing more water and less oil to be produced.

In view of the foregoing, it can be appreciated that it is especially difficult to recover petroleum from a formation which contains relatively viscous petroleum, e.g. petroleum having a viscosity in excess of 50 centipoise, especially if this petroleum overlays an active bottom water formation. Thus it can be seen that there is substantial need for an oil recovery technique which will permit recovery of viscous petroleum from formations which are in contact with and overlay water saturated porous formations.

SUMMARY OF THE INVENTION

We have discovered, and this constitutes our invention, that petroleum may be recovered from subterranean petroleum-containing formations overlaying and in contact with a water saturated porous formation by injecting into the formation at the oil-water interface, a solvent whose density is less than the density of water and greater than the density of the formation petroleum. In a preferred embodiment, the solvent has a boiling point less than the boiling point of the formation petroleum. The solvent is comprised of a mixture of conventional solvent capable of dissolving or partitioning into formation petroleum such as L.P.G., propane, butane, pentane, or naphtha, etc. and a dense solvent such as carbon disulfide or a halogenated hydrocarbon solvent which is insoluble in and unreactive with water, such as carbon tetrachloride, trichloro methane and mixtures thereof. By varying the proportions of the conventional solvent for formation petroleum and dense solvent, a solvent mixture can be formulated which has a density intermediate between the density of water and the density of any particular formation petroleum to be recovered. Since the boiling point of the solvent mixture is less than the boiling point of the formation petroleum, it is an attractive feature of this process that produced fluid, which comprises a mixture of formation petroleum and the injected solvent, can be separated on the surface for solvent re-use. Vacuum separation of the solvent from the produced formation petroleum is carried out on the surface, and the separated solvent is thereafter subjected to compression liquefaction and is reinjected into the formation, thus reducing substantially the quantity of solvent necessary for a continuous solvent flooding operation according to our invention.

BRIEF DESCRIPTION OF THE DRAWING

The FIGURE is a cross-sectional view of a formation being subjected to the process of our invention, together with the surface equipment necessary for separation and recycling of the solvent.

DESCRIPTION OF THE PREFERRED EMBODIMENTS

This invention concerns a novel method for recovering petroleum from a formation overlaying and in contact with a water saturated, porous formation, especially formations containing relatively viscous petroleum. There are many such formations, and recovery of petroleum therefrom is sometimes effective, depending on the viscosity of petroleum contained in the formation. In the instance of formations containing low viscosity petroleum, recovery may proceed through the primary recovery phase with little difficulty, and the presence of the underlying water saturated formation is to some extent a benefit to the recovery process. The tendency for bottom water coning to occur increases as the ratio of the viscosity of the formation petroleum to viscosity of connate water increases. As the water cone migrates upward, water is produced along with the formation petroleum, and the economics of recovery are seriously affected by the necessity of producing, handling and disposing of large volumes of water along with the produced petroleum. Single well bore cycling, as is described for example in U.S. Pat. No. 2,832,416, is sometimes effective for reducing the tendency for bottom water coning to occur.

Our process makes use of a solvent system which has very special properties, and these properties may be tailored to the particular formation in which the process of our invention is to be applied. To be effective for the process described in this specification, the injected solvent system must have the following properties:

1. The specific gravity of the solvent must be less than the specific gravity of water.
2. The specific gravity of the injected solvent must be greater than the specific gravity of the petroleum contained in the formation to which the process is to be applied.

It is highly desirable that the solvent have the following additional properties:

1. The boiling point of the injected solvent mixture must be substantially less than the boiling point of the hydrocarbon fluid contained in the formation, to permit vacuum distillation of the solvent on the surface for reinjection of the solvent into the formation.
2. The thermal stability of each component must be such that they may be separated by vacuum distillation, if heat is required, without decomposition.
3. The components should not undergo any appreciable reaction with each other which would affect the chemical properties of the solvent system, nor should they react with or be appreciably soluble in water. This would eliminate certain halogenated organic compounds such as for example, allylic halides which are otherwise good solvents for petroleum.
4. The components of the solvent mixture must be relatively inexpensive and readily available.

No single solvent is believed to satisfy all these critical requirements, but a mixture of two or more components will satisfy the requirement. The mixture comprises:

1. A conventional solvent for petroleum, such as aliphatic hydrocarbons including L.P.G. (liquefied petroleum gas), propane, butane, pentane, naphtha, and mixtures thereof, or aromatic solvents such as toluene.
2. A solvent having a density substantially greater than the specific gravity of most aliphatic hydrocarbons, e.g. greater than 0.8 to 0.9. Suitable materials for the dense solvent include carbon disulfide, $CS_2$ and halogenated hydrocarbons which are insoluble in and essentially unreactive with water such as carbon tetrachloride, $CCl_4$. As can be seen from the handbook data contained in Table I below, the pisecific gravity of carbon disulfide and carbon tetrachloride are substantially greater than propane, butane, pentane and hexane. Moreover, the boiling points of carbon disulfide and carbon tetrachloride are sufficiently low and thermal stability sufficiently high to permit relatively complete vacuum separation of these materials from the produced petroleum, and they are essentially unreactive with water at reservoir conditions.

TABLE I

| Specific Gravities and Boiling Points of Solvents | | |
|---|---|---|
| Material | Specific Gravity | Boiling Point °C |
| Ethane ($C_2H_6$) | 0.546 | −88.6 |
| Propane | 0.585 | −42.2 |
| n-Butane | 0.60 | −0.6 |
| n-Pentane | 0.630 | 36.3 |
| iso-Hexane | 0.654 | 60.2 |
| Carbon Disulfide | 1.263 | 46.3 |
| Trichloro methane (chloroform) | 1.498 | 60.0 |
| Carbon Tetrachloride | 1.595 | 76.8 |
| Chlorobenzene | 1.106 | 132.0 |

Carbon disulfide, also known as carbon bisulfide, is well known to be an effective solvent as well as a feed stock for manufacturing other solvents including carbon tetrachloride. Carbon disulfide is easily manufactured by heating coke and sulfur in an electric furnace. Carbon disulfide is insoluble in and unreactive with water and is an excellent solvent for most oils. It is especially suitable for dissolving bitumen, and since bitumen resists dissolution by most solvents, the use of carbon disulfide as the dense solvent component of the multiple component solvent mixture of our invention is especially suitable in applications to formations cotaining appreciable quantities of bitumen.

Carbon tetrachloride is another excellent material for use as the dense solvent for this invention. As can be seen from the data in Table I above, it has a specific gravity greater than the specific gravity of carbon disulfide. Moreover, the dense solvent component may be comprised of a mixture of carbon disulfide and carbon tetrachloride. Other halogenated materials may also be used if readily available, but it would be expected that the cost of such materials may not justify their use. Ordinarily the dense component of the solvent system will be either carbon disulfide or carbon tetrachloride or a mixture thereof. These mixtures comprise an especially favored embodiment since the hazards of flammability and low flash point associated with carbon disulfide would be largely overcome. A carbon disulfide in water emulsion may also be used as the dense solvent.

A conventional solvent for petroleum may be any readily available hydrocarbon or hydrocarbon derivative, although ordinarily a simple aliphatic hydrocarbon such as propane, butane, pentane, naphtha or L.P.G., or an aromatic solvent such as benzene or toluene will be suitable for use in this invention. It will be sufficiently inexpensive and readily available to permit its use without adversely affecting the economics of the operation.

A method of employing this solvent for the recovery of petroleum is best understood by referring to the FIGURE, in which injection well 1 is drilled into the formation to a depth slightly below the static water-oil interface, and perforations 2 are formed in the well casing in the general vicinity of the oil-water interface. Solvent is initially mixed in container 3 and pumped into injection well 1, where it passes into the subterranean formation near the oil-water interface 4. Since the specific gravity of the injected solvent mixture is less then the specific gravity of water, the injected solvent mixture will not move into the water table but will remain above it. Also, since the specific gravity of the injected solvent is greater than the specific gravity of the formation petroleum, the solvent mixture will not migrate upward into the petroleum formation; rather it will remain essentially below the petroleum. Thus the injected solvent will be confined to a relatively narrow zone which represents an interfacial region between the formation petroleum and the water contained in the bottom aquifer. The oilwater interface 4 is normally essentially flat in the formation before production is begun. The subterranean petroleum formation is also penetrated by at least one production well 5 and optionally other production wells as is shown by item 10 in the FIGURE. Perforations in the production wells 5 and 10 are made somewhat intermediate between the original oil-water contact and the top to the petroleum formation, since it is anticipated that some bottom water coning will occur. Bottom water coning will not be as severe in the instance of this process as it would be in normal primary production, e.g. in the instance of pumping production petroleum from a formation such as is shown in the FIGURE, because of the pressure gradients imposed by the injected fluid and also because of the fact that the injected fluid has a specific gravity somewhat greater than the specific gravity of the petroleum formation. As the injected fluid moves away from the injection well 1, it is mixed with and dissolves oil from the oil saturated zone in the area in which the solvent is injected, and the concentration of formation petroleum dissolved in the injected fluid increases with increasing distance from the point of injection into the formation. The fluid produced through production wells 5 and 6 is essentially a saturated mixture of formation petroleum in the injected solvent, and it is this fluid which is produced to the surface of the earth by production wells 5 and 10. The produced fluid is thereafter passed into a separator vessel 6. The suction of compressor 7 is supplied to the upper portion of vessel 6, such that the pressure within vessel 6 is below atmospheric pressure. This results in vaporization of the components present in the injected solvent mixture, which pass via a conductor 8 into suction inlet of compressor 7. The vapor phase solvent components separated in separation vessel 6 are compressed in compressor 7 and liquefied in condenser 9, from which they are reinjected into injection well 1.

Initially, essentially all of the injected solvent will be obtained from other sources and injected into the well via vessel 3. When the produced fluids contain sufficient solvents to justify separation, increasing proportions of the injected solvent will be obtained from the components extracted from the produced fluid, until most of the solvent injected will be derived from the surface separation-reliquefication equipment. Although it is not an essential feature of this invention that the solvent be separated from the produced crude, reliquefied and recycled by the injection well, the cost of operating the process of our invention without this feature may make the process uneconomical.

In another embodiment of our invention, a gas capable of dissolving in the petroleum and causing it to swell is injected simultaneously with the solvent mixture. For example, carbon dioxide $CO_2$ may be dissolved in the solvent mixture, and/or may be injected along with the solvent into the formation. The carbon dioxide migrates upward into the oil saturated zone, and dissolves in the petroleum. Dissolution of carbon dioxide in petroleum causes the petroleum to swell and reduces the viscosity thereof. The viscosity reduction resulting from the use of carbon dioxide is additive to the viscosity reduction resulting from the solvent diluting the petroleum, and so the overall effectiveness of the process is improved.

It should be stressed that the process as described above differs substantially from a conventional horizontal displacement process, whether of a water flood type or one involving the injection of a solvent slug followed by a water injection. In the instant invention, only a small portion of the reservoir is invaded by the injected solvent on a single pass. A pancake-shaped zone extending outward from the injection point to the production well or wells is formed by the injected solvent. As the injected solvent dissolves formation petroleum, the area previously occupied by the formation petroleum is reoccupied by water migrating upward from the underlying water saturated zone, so the pancake-like zone of displacement slowly moves upward as the process continues. Thus the zone being swept by the injected solvent in any given time represents a small percentage of the total pore volume of the formation, which materially reduces the amount of solvent which would be required. Injection of solvent continues, with the interfacial zone between the formation petroleum and the underlying water slowly moving upward, until essentially all of the formation has been swept by the solvent.

The invention can be more fully understood by reference to the following field example, which is offered only for the purpose of illustration and is not intended to be limited or restrictive of the invention, which will be defined more precisely hereinafter in the claims.

FIELD EXAMPLE

A subterranean, petroleum containing formation is found at a depth of 1,000 feet, and it is determined that the thickness of the formation is 55 feet. It is also discovered that the average viscosity of the formation fluid is 100 centipoise. Attempts to recover petroleum from this formation by conventional primary recovery means are ineffective, due to the presence of the active bottom water drive and relatively high viscosity of the formation petroleum. Attempts to pump the petroleum from production wells results in severe bottom water coning, which causes the water-oil ratio to increase rapidly to an uneconomical level before any significant amount of petroleum is recovered.

The API gravity of the petroleum contained in this formation is 20° (7.7 pounds per gallon). Since water has a density of 8.33 pounds per gallon, it is necessary to obtain a solvent having a density between 7.7 pounds per gallon and 8.33 pounds per gallon. It is determined that this criteria is best met by mixture of 62 percent by weight carbon disulfide at 38 percent by weight butane, resulting in a density of 8.04 pounds per gallon. The 62 percent carbon disulfide, 38 percent butane mixture is injected into the formation at the oil-water contact and produced fluids are taken from a production well drilled into the formation for that purpose and perforated near the center of the oil-containing interval. The produced fluid is thereafter pumped into a vacuum separation vessel connected to the suction of a compressor located on the surface. Since the atmospheric boiling point of butane and carbon disulfide are 31°F. and 150°F. respectively, the solvent is completely vaporized within the vacuum separation vessel, compressed within the surface compressor and thereafter reliquefied in a condenser for reinjection into the formation. This operation is continued, continually separating the injected fluid, compressing and reliquefying it and reinjecting it into the injection well, until the swept zone has moved upward into the upper portion of the oil saturated interval. After the swept zone has moved to the uppermost portion of the oil-saturated interval, and essentially no additional formation petroleum is being recovered, the solvent mixture remaining in the formation is recovered by water injection or injection of other inexpensive solvent such as natural gas, ethane, propane, butane, etc. until all the more expensive materials have been recovered by the surface equipment for reuse in other similar recovery operations.

It can be seen from the above example that a conventional solvent for petroleum would not function satisfactorily if utilized according to the procedural description above. Injection of butane into the formation near the oil-water interface would not achieve the type of displacement described above. Since butane has a specific gravity substantially less than the specific gravity of the formation petroleum, it would move upward into the oil saturated zone, lose its discreteness, and bypass a substantial portion of the oil between the injected butane and the aquifer below. Furthermore, the solvent system of our invention could not be utilized in a downward moving displacement as is sometimes utilized, since the specific gravity of the injected fluid would cause immediate fingering into the oil saturated zone, which would result in bypassing a significant portion of petroleum.

While numerous specific embodiments of both the solvent components and the procedure for using them have been disclosed, many other embodiments will be apparent to those skilled in the art of oil recovery operation without departing from the true spirit and scope of our invention, and it is intended that the spirit and scope of this invention be defined only by the claims which are appended hereinafter below.

We claim:

1. A method for recovering petroleum from a subterranean, petroleum-containing, porous formation, penetrated by at least one injection well and by at least one production well, said petroleum-containing formation overlaying and in contact with a water saturated, porous formation, comprising injecting into said formation near the oil-water interface a solvent for petroleum having a density less than the density of water and greater than the density of the petroleum contained in the formation, and producing the solvent with formation petroleum dissolved therein at the production well.

2. A method as defined in claim 1 wherein the solvent comprises,
    a. conventional solvent for petroleum, and
    b. a solvent for petroleum having density greater than the density of the formation petroleum.

3. A method as recited in claim 2 wherein the conventional solvent for petroleum is an aromatic solvent.

4. A method as recited in claim 3 wherein the aromatic solvent is toluene.

5. A method as recited in claim 3 wherein the aromatic solvent is benzene.

6. A method as recited in claim 2 wherein the conventional solvent for petroleum is selected from the group consisting of ethane, propane, butane, pentane, hexane, naphtha, liquefied petroleum gas, and mixtures thereof.

7. A method as recited in claim 6 wherein the conventional solvent for petroleum is propane.

8. A method as recited in claim 6 wherein the conventional solvent for petroleum is butane.

9. A method as recited in claim 6 wherein the conventional solvent for petroleum is pentane.

10. A method as recited in claim 6 wherein the conventional solvent for petroleum is hexane.

11. A method as recited in claim 6 wherein the conventional solvent for petroleum is liquefied petroleum gas.

12. A method as recited in claim 6 wherein the conventional solvent for petroleum is naphtha.

13. A method as recited in claim 2 wherein the oil solvent having a density greater than the density of the petroleum contained in the formation is selected from the group consisting of carbon disulfide and halogenated hydrocarbons which are essentially unreactive with water.

14. A method as recited in claim 13 wherein the petroleum solvent having a density greater than the density of the formation petroleum is carbon disulfide.

15. A method as recited in claim 13 wherein the halogenated hydrocarbon petroleum solvent having a density greater than the density of the formation petroleum is carbon tetrachloride.

16. A method as recited in claim 13 wherein the halogenated hydrocarbon petroleum solvent having a density greater than the formation petroleum is trichloro methane.

17. A method as recited in claim 1 wherein the produced fluid consisting of formation petroleum and injected solvent is subjected at the surface to vacuum separation, wherein the solvent is separated in the vapor phase and subsequently compressed and reliquefied, and reinjected into the injection means.

18. A method as recited in claim 1 wherein carbon dioxide is also injected into the petroleum reservoir.

* * * * *